Patented May 19, 1931

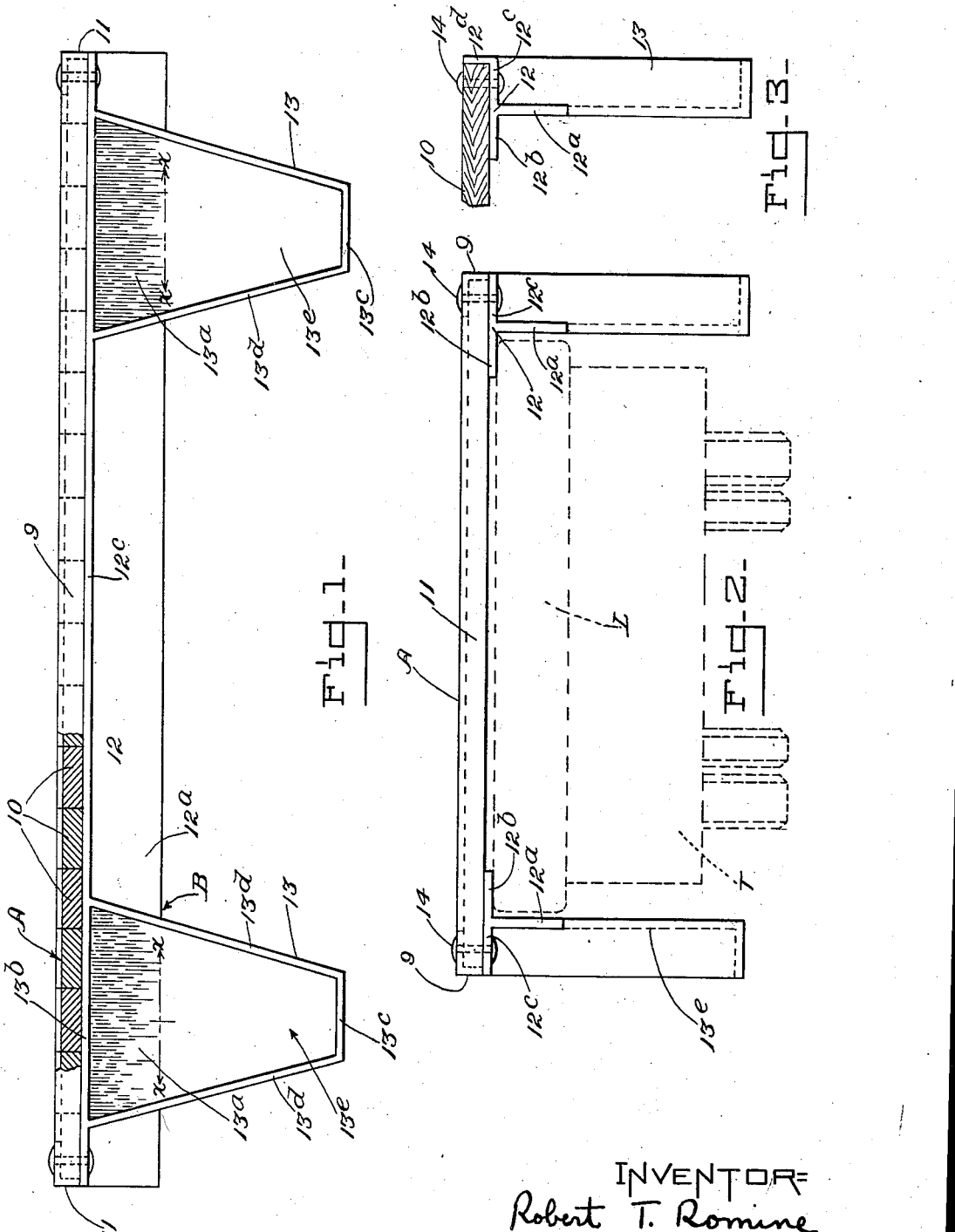

1,806,085

UNITED STATES PATENT OFFICE

ROBERT T. ROMINE, OF MOUNT CLEMENS, MICHIGAN

PORTABLE PLATFORM AND METHOD OF MAKING THE SAME

Application filed July 3, 1926. Serial No. 120,301.

This invention relates to portable load carrying platforms, and especially to that class of portable platforms capable of being used in connection with lift trucks of the load elevating platform type, and wherein the truck platform may be inserted or introduced beneath the floor of the portable platform to elevate and transport the same.

An object of the present invention is to provide a portable platform of the foregoing class having improved means for supporting the floor of the platform so as to permit the same to carry with safety loads as high as ten and fifteen tons, and also permitting the truck platform to lift it with such loads without danger of breaking the floor or otherwise damaging it.

A further object is to provide an improved platform which may be relatively cheaply constructed, reducing considerably the labor expense in assembling the platform, and which at the same time will be relatively light, stronger, and capable of more efficiently sustaining impacts and blows from the truck in use, as well as the stresses and strains resulting in lifting or supporting extreme loads of ten, fifteen or more tons.

Other objects of this invention will appear in the following description and appended claims, reference being had to the accompanying drawings forming a part of this specification wherein like reference characters designate corresponding parts in the several views.

Fig. 1 is a side elevation partly broken away illustrating a present preferred form of my invention.

Fig. 2 is an end elevation of the construction shown in Fig. 1 illustrating diagrammatically the lift truck in position beneath the platform.

Fig. 3 is a fragmentary detail view illustrating a somewhat modified form of my invention.

Before explaining in detail the present invention, and the method or mode of operation embodied therein, it is to be understood that the invention is not limited in its application to the details of construction and arrangement of parts illustrated in the accompanying drawings, since the invention is capable of other embodiments and of being practised or carried out in various ways. Also it is to be understood that the phraseology or terminology employed herein is for the purpose of description and not of limitation, and it is not intended to limit the invention beyond the terms of the several claims hereto appended or the requirements of the prior art.

The present improved portable platform in its preferred form herein shown and described comprises in general a platform top or load carrying floor, preferably formed of a multiplicity of cross boards, and a supporting truss mounted beneath the floor and extending along each of a pair of opposite sides of the platform beneath the boards. Each truss support in accordance with the present method comprises a single steel casting and includes as an integral structure or member a structural bar preferably of T-shape formation and a pair of depending legs all cast from the same metal. The structural bar forming a part of the casting comprises a vertical flange extending along the outer sides of the leg portions of the casting to provide a guide for the lifting truck when introduced beneath the platform, and this bar also comprises inwardly and outwardly extending horizontal flanges bearing against the bottom of the platform floor. The inwardly extending flanges provide means for receiving the upward thrust of the truck platform when elevated to lift the portable platform and its load.

Referring to the drawings, the portable platform comprises a suitable floor A preferably comprising a multiplicity of cross members or boards 10. The platform floor is protected around its four edges, as shown in Figs. 1 and 2, by means of a rectangular metallic frame, which may comprise angle bars or strips 9 at the opposite longitudinal sides of the platform, and similar angle bars 11 at the opposite ends, these angle bars confining the edges of the platform boards and protecting them against wear and collisions.

The load carrying platform or floor A is supported from beneath preferably along each longitudinal side edge by means of a one piece metal truss B preferably constructed of cast steel. Each one of these trusses in the present instance comprises a T-shaped structural bar or beam 12 having a pair of longitudinally spaced V-shaped legs 13 formed as a part thereof and from the same metal.

As shown in Figs. 1 and 2 each supporting bar 12 preferably comprises a vertical flange 12a, and oppositely extending inner and outer horizontal flanges 12b and 12c, forming therewith a flat broad surface upon which the cross boards of the platform rest.

As shown particularly in Fig. 1, that portion of the central web of each leg 13 embraced above the line x—x also forms a part of the flange 12a of the bar 12, and the upper horizontal flange 13b of each leg also forms an integral part of the outwardly extending horizontal flange 12c of the T-bar 12. Thus it will be seen that the T-bar and legs are united and formed of the same metal, thereby providing a powerful supporting structure capable of withstanding and lifting extraordinary loads. The T-bar and legs therefore form a single truss member and there are no rivets or bolts between these parts to bend or shear as heretofore. In previous types of portable platforms, the legs were no stronger than the several bolts or rivets connecting them in place. In the present case however the legs 13 are at least as strong as any other part of the structure, and will not collapse without destroying the entire truss.

Each leg 13 comprises a horizontal flange or foot 13c forming a broad bearing surface, and a pair of upwardly extending diverging flanges or sides 13d, and these parts are integrally united by means of the central web portion 13e, which is cast from the same metal as the web portion 13a which forms the upper part of the web and also a part of the flange 12a.

The present improved platform is especially intended to be used in connection with a load elevating truck of the lift type. In Fig. 2 the truck T is shown with the lift platform L introduced beneath the floor A of the platform, the truck platform being elevated so as to carry the portable platform as shown in the drawing. The truck when introduced or inserted beneath the portable platform is guided into position therebeneath by means of the parallel spaced vertical flanges 12a of the trusses, and it will be seen that the legs 13 are positioned outside the inner vertical planes of these guide flanges 12a. The impact of the truck when it is propelled beneath the platform, and particularly when propelled at an angle, which frequently happens in practice, is directly taken by the vertical flanges 12a, and these flanges are stiffened and strengthened to resist this impact by means of the legs 13 and the flanges 12c.

In building the present improved platform the method I prefer to employ, in order to provide the required strength with a minimum of labor expense in assembly, consists in casting in a single piece of steel each structural bar or beam 12 with the legs 13 cast as a part of the metal thereof. The entire truss therefore including the legs is a single casting, and may then be annealed to give the desired tensile strength to the truss. The angle iron binding or frame members 9 and 11 are assembled in position and the floor boards together with this frame are then mounted on the truss supports and secured as by means of rivets 14 to the flanges 12c at the corners of the platform.

In the construction shown in Fig. 3 the truss is cast in the form of a T-bar 12 as above described having legs 13 formed as a part of the casting, but in this instance the outwardly extending flange 12c is cast with a vertical angularly extending flange 12d forming with the flange 12c a pocket to embrace the longitudinal side edge of the platform floor.

In constructing the platform in this manner the angle iron frame members 11 at longitudinal sides of the platform may be dispensed with since the longitudinal portions 12d of each truss will form a protecting medium for the side edges of the platform.

What I claim is:

1. A portable platform comprising a load supporting floor, a longitudinal truss member at each side comprising a horizontal flange supporting the floor, and a vertical guide flange integral therewith, a depending channel leg comprising a central vertical web constituting an integral extension of said guide flange and extending in the plane of said guide flange.

2. A portable platform comprising a load supporting floor and at each side thereof a support in the form of a unitary integral structure having a longitudinally extending truss member angular in cross section and a supporting leg depending therefrom, the truss member having a vertical guide flange extended downwardly at said leg to form a web on the latter, said web having a laterally extending flange.

3. A portable platform comprising a load supporting floor and a support in the form of a unitary integral structure, said structure having a truss member formed with a depending vertical guide flange and a laterally extending horizontal flange, said guide flange being extended downwardly at spaced points to form a web for a supporting leg and a flange on said web beneath said horizontal truss flange and directly joined therewith, said web flange being disposed lengthwise of the leg for substantially the full length thereof, and also extending transversely of the leg at its lower end.

In testimony whereof I affix my signature.

ROBERT T. ROMINE.